United States Patent
Müller et al.

(10) Patent No.: US 6,617,467 B1
(45) Date of Patent: Sep. 9, 2003

(54) PROCESS FOR PRODUCING POLYALKYLENE CARBONATES

(75) Inventors: Ulrich Müller, Neustadt (DE); Gerrit Luinstra, Mannheim (DE); Omar M. Yaghi, Ann Arbor, MI (US)

(73) Assignees: BASF Aktiengesellschaft, Ludwigshafen (DE); University of Michigan, Ann Arbor, MI (US)

( * ) Notice: Subject to any disclaimer, the term of this patent is extended or adjusted under 35 U.S.C. 154(b) by 0 days.

(21) Appl. No.: 10/279,940

(22) Filed: Oct. 25, 2002

(51) Int. Cl.$^7$ ................................................ C07C 69/96
(52) U.S. Cl. .................... 558/265; 585/18; 585/520
(58) Field of Search .................. 558/265; 585/18, 585/520

(56) References Cited

PUBLICATIONS

Donald J. Darensbourg, et al., Bis 2,6–difluorophenoxide Dimeric Complexes of Zinc and Cadmium and Their Phosphine Adducts: Lessons Learned Relative to Carbon Dioxide/Cyclohexene Oxide Alternating Copolymerization Processes Catalyzed by Zinc Phenoxides, J. Am. Chem. Soc. 2000, vol. 122, No. 50,(2000) pp. 12487–12496.

Tsung–Ju Hsu, et al., Block copolymerization of carbon dioxide with cyclohexene oxide and 4–vinyl–1–cyclohexene–1,2–epoxide in based poly(propylene carbonate) by yttrium–metal coordination catalyst, Elsevier, Polymer Communication, Polymer 43(2002) pp. 4535–4543.

David R. Moore, et al., Electronic and Steric Effects on Catalysts for $CO_2$/Epoxide Polymerization: Subtle Modifications Resulting in Superior Activities, Agnew. Chem. Int. Ed.(2002) 41, No. 14, pp. 2599–2602.

Stephan Mang, et al., Copolymerization of $CO_2$ and 1,2–Cyclohexene Oxide Using a $CO_2$–Soluble Chromium Porphyrin Catalyst, Macromolecules(2000,) 33, pp. 303–308.

*Primary Examiner*—Taofiq Solola
(74) *Attorney, Agent, or Firm*—Oblon, Spivak, McClelland, Maier & Neustadt, P.C.

(57) ABSTRACT

A polyalkylene carbonate, an alternating copolymer, may be prepared by the ring opening of an alkene oxide or an alkene oxide precursor in the presence of carbon dioxide or any substance delivering carbon oxide, in the presence of at least one catalyst comprising a metal-organic framework material, wherein said framework material comprises pores and a metal ion and an at least bidentate organic compound, said bidentate organic compound being coordinately bound to the metal ion.

20 Claims, 2 Drawing Sheets

PROCESS FOR PRODUCING POLYALKYLENE CARBONATES

BACKGROUND AND SUMMARY OF THE INVENTION

Field of the Invention

The catalytic reaction of an alkene oxide such as propylene oxide (PO) and carbon dioxide may results in various products, e.g cyclic propylene carbonates used as solvent in coatings. Another important product is polypropylenecarbonate, an alternating copolymer obtainable from the ring opened reaction of said alkene oxide (epoxide) in the presence of carbon dioxide.

Polyalkylene carbonates are useful materials because of their properties such as clean combustion, transparency, excellent gas barrier, improvements of tensile strength in blends etc. These polymers may be obtained from the alternating copolymerization of carbon dioxide and oxiranes (epoxides). The process needs a catalyst in order to proceed. These catalysts may either be molecular and soluble in appropriate organic solvents or may be heterogeneous catalysts.

Discussion of the Background

According to the prior art, several systems are used as catalysts in the copolymerization of epoxides and carbon dioxide. These catalysts compromise compounds or mixtures of compounds that are prepared from metal-alkyl compounds such as diethyl zinc or trimethyl aluminum (see, e.g. J. Am.Chem, Soc. 2000, 122, 12487 by Darensbrough, Wildeson, Yarbrough, Reibenspies or Polym. Mater. Sci. Eng. 1996, 74, 431, by Darensbrough). Co-reacting compounds in the preparation are, in general, compounds with Broendsted acidic properties, amongst others, phenols, alcohols, carboxylic acids (see, e.g., Polymer 2002, 43, 4535–43, Hsu, Tan), acetonates, ketoiminates (see, e.g. Angew. Chem., Int. Ed. 2002, 41(14), 2599, Moore D. R. Cheng M. Lobkovsky E B. Coates G W). Metal amides such as Zn(di(bistrimethylsilylamid) have been applied as well. Metal alkyl compounds and amides are expensive and sensitive to air and in part even self-igniting. They are therefore hard to handle on an industrial scale.

Chromium catalysts have been described, e.g. by Holmes and coworkers in: Macromolecules (2000) 33, 303. However, chromium catalyst residues are not readily removed and yield colored polymer products. Such catalysts also show high tendency to form cyclic compounds. Also, metal salts may be used as catalyst precursors, but catalysts containing these compounds still lack the catalytic activity needed for a useful production process.

In summary, activity and productivity as well as safety compatibility of the catalysts containing Zn known from the prior art are limited. Furthermore, the catalysts known from the prior art are molecular in nature and do not form a porous framework by themselves, said framework being a particularly advantageous embodiment for the realization of these reactions in industrial-scale reactors. In summary, a need exists for new catalysts to be used for these polymerization reactions if they are to be commercialized.

It would therefore be of importance to develop a solid state catalyst with a high number of accessible centers which optionally can be removed by filtration or sedimentation from the polymer product mixture. For example, one of the most active solid state catalysts, ZnGlutarates as prepared by Ree from Glutaric acid and ZnO, has a BET-surface area of less than 20 $m^2/g$. It would obviously be of importance to develop high surface area catalysts.

In a promising novel and alternative strategy to create micro- and/or mesoporous catalytically active materials in general, metal ions and molecular organic building blocks are used to form so-called metal-organic frameworks (MOFs). The metal-organic framework materials as such are described, for example, in. U.S. Pat. No. 5,648,508, EP-A-0 709 253, M. O'Keeffe et al., *J Sol. State Chem.*, 152 (2000) p. 3–20, H. Li et al., *Nature* 402 (1999) p. 276 seq., M. Eddaoudi et al., *Topics in Catalysis* 9 (1999) p. 105–111,B. Chen et al., *Science* 291 (2001) p. 1021–23.

Among the advantages of these novel materials, in particular for applications in catalysis, are the following:

(i) larger pore sizes can be realized than for the zeolites used presently (ii) the internal surface area is larger than for porous materials used presently (iii) pore size and/or channel structure can be tailored over a large range (iv) the organic framework components forming the internal surface can be functionalized easily (v) the metal-organic framework according to the invention is stable even if no host, solvent or any other additional substance is present, i.e. the framework does not collapse and/or interpenetrate and/or change its shape and dimension. This puts the material according to the invention in contrast to other metal-organic materials that maybe used as catalysts.

However, these novel porous materials have only been described as such. The use of these catalytically active materials for copolymerization reactions, in particular for the polymerization of epoxides with carbon dioxide, has not been disclosed yet. In related applications, the use of these novel porous materials as shaped bodies (U.S. application Ser. No. 10/157,182) and for epoxidation reactions (U.S. application Ser. No. 10/157,494) has been described. In the context of the present invention it is of particular interest that Zn is easily built as an active metal ion into said frameworks.

SUMMARY OF THE INVENTION

It is an object of the present invention to provide a process and a catalyst for the reaction of an alkene oxide or an alkene oxide precursor in the presence of carbon dioxide or any substance delivering carbon oxide, wherein the catalyst for said reaction contains a novel, more effective material, in addition to, or instead of, catalytic materials according to the prior art.

This object is solved by providing a process for the reaction of an alkene oxide or an alkene oxide precursor in the presence of carbon dioxide or any substance delivering carbon oxide in the presence of a catalyst, wherein said catalyst contains a metal-organic framework material comprising pores and at least one metal ion and at least one at least bidentate organic compound, which is coordinately bound to said metal ion, and wherein said framework material retains its dimension and shape even while no other materials are present.

DESCRIPTION OF THE PREFERRED EMBODIMENTS

As has been mentioned above, metal-organic framework materials as such are described in, for example, U.S. Pat. No. 5,648,508, EP-A-0 709 253, M. O'Keeffe et al., *J Sol. State Chem.*, 152 (2000) p. 3–20, H. Li et al., *Nature* 402 (1999) p. 276 seq., M. Eddaoudi et al., *Topics in Catalysis* 9 (1999) p. 105–111,B. Chen et al., *Science* 291 (2001) p. 1021–23. An inexpensive way for the preparation of said materials is the subject of DE 10111230.0. The content of these publications, to which reference is made herein, is fully incorporated in the content of the present application.

The catalyst used in the present invention contains at least one metal-organic framework material, for example one of the materials described below.

The metal-organic framework materials, as used in the present invention, comprise pores, particularly micro- and/or mesopores. Micropores are defined as being pores having a diameter of 2 nm or below and mesopores as being pores having a diameter in the range of above 2 nm to 50 nm, respectively, according to the definition given in *Pure Applied Chem.* 45, p. 71 seq., particularly on p. 79 (1976). The presence of the micro- and/or mesopores can be monitored by sorption measurements for determining the capacity of the metal-organic framework materials to take up nitrogen at 77 K according to DIN 66131 and/or DIN 66134.

For example, a type-I-form of the isothermal curve indicates the presence of micropores {see, for example, paragraph 4 of M. Eddaoudi et al., *Topics in Catalysis* 9 (1999)}. In a preferred embodiment, the specific surface area, as calculated according to the Langmuir model (DIN 66131, 66134) is above 5 $m^2/g$, preferably above 10 $m^2/g$, more preferably above 50 $m^2/g$, particularly preferred above 500 $m^2/g$ and may increase into the region of to above 3000 $m^2/g$.

As to the metal component within the framework material that is to be used according to the present invention, particularly to be mentioned are the metal ions of the main group elements and of the subgroup elements of the periodic system of the elements, namely of the groups Ia, IIa, IIIa, IVa to VIIIa and Ib to VIb. Among those metal components, particular reference is made to Mg, Ca, Sr, Ba, Sc, Y, Ti, Zr, Hf, V, Nb, Ta, Cr, Mo, W, Mn, Re, Fe, Ru, Os, Co, Rh, Ir, Ni, Pd, Pt, Cu, Ag, Au, Zn, Cd, Hg, Al, Ga, In, Tl, Si, Ge, Sn, Pb, As, Sb, and Bi, more preferably to Zn, Cu, Ni, Pd, Pt, Ru, Rh and Co. As to the metal ions of these elements, particular reference is made to: $Mg^{2+}$, $Ca^{2+}$, $Sr^{2+}$, $Ba^{2+}$, $Sc^{3+}$, $Y^{3+}$, $Ti^{4+}$, $Zr^{4+}$, $V^{4+}$, $V^{3+}$, $V^{2+}$, $NB^{3+}$, $Ta^{3+}$, $Cr^{3+}$, $Mo^{3+}$, $W^{3+}$, $Mn^{3+}$, $Re^{3+}$, $Re^{2+}$, $Fe^{3+}$, $Fe^{2+}$, $Ru^+$, $Ru^{2+}$, $Os^{3+}$, $Os^{2+}$, $Co^{3+}$, $Co^{2+}$, $Rh^{2+}$, $Rh^+$, $Ir^{2+}$, $Ir^+$, $Ni^{2+}$, $Ni^+$, $Pd^{2+}$, $Pd^+$, $Pt^{2+}$, $Pt^+$, $Cu^{2+}$, $Cu^+$, $Ag^+$, $Au^+$, $Zn^{2+}$, $Cd^{2+}$, $Hg^{2+}$, $Al^{3+}$, $Ga^{3+}$, $In^{3+}$, $Tl^{3+}$, $Si^{4+}$, $Si^{2+}$, $Ge^{4+}$, $Ge^{2+}$, $Sn^{2+}$, $Pb^{4+}$, $Pb^{2+}$, $As^{5+}$, $As^{3+}$, $As^+$, $Sb^{5+}$, $Sb^{3+}$, $Sb^+$, $Bi^{5+}$, $Bi^{3+}$ and $Bi^+$.

With regard to the preferred metal ions and further details regarding the same, particular reference is made to: EP-A 0 790 253, particularly to p. 10, l. 8–30, section "The Metal Ions", which section is incorporated herein by reference. In the context of the present invention, Zn is particularly preferred as the metal component.

In addition to the metal salts disclosed in EP-A 0 790 253 and U.S. Pat. No. 5,648,508, other metallic compounds can be used, such as sulfates, phosphates and other complex counterion metal salts of the main- and subgroup metals of the periodic system of the elements. Metal oxides, mixed oxides and mixtures of metal oxides and/or mixed oxides with or without a defined stoichiometry are preferred. All of the above mentioned metal compounds can be soluble or insoluble and they may be used as starting material either in form of a powder or as a shaped body or as any combination thereof.

As to the at least bidentate organic compound, which is capable to coordinate with the metal ion, in principle all compounds can be used which are suitable for this purpose and which fulfill the above requirements of being at least bidentate. Said organic compound must have at least two centers, which are capable to coordinate with the metal ions of a metal salt, particularly with the metals of the aforementioned groups. With regard to the at least bidentate organic compound, specific mention is to be made of compounds having i) an alkyl group substructure, having from 1 to 10 carbon atoms, ii) an aryl group substructure, having from 1 to 5 phenyl rings, iii) an alkyl or aryl amine substructure, consisting of alkyl groups having from 1 to 10 carbon atoms or aryl groups having from 1 to 5 phenyl rings, said substructures having bound thereto at least one at least bidentate functional group "X", which is covalently bound to the substructure of said compound, and wherein X is selected from the group consisting of $CO_2H$, $CS_2H$, $NO_2$, $SO_3H$, $Si(OH)_3$, $Ge(OH)_3$, $Sn(OH)_3$, $Si(SH)_4$, $Ge(SH)_4$, $Sn(SH)_3$, $PO_3H$, $AsO_3H$, $AsO_4H$, $P(SH)_3$, $As(SH)_3$, $CH(RSH)_2$, $C(RSH)_3$, $CH(RNH_2)_2$, $C(RNH_2)_3$, $CH(ROH)_2$, $C(ROH)_3$, $CH(RCN)_2$, $C(RCN)_3$, wherein R is an alkyl group having from 1 to 5 carbon atoms, or an aryl group consisting of 1 to 2 phenyl rings, and $CH(SH)_2$, $C(SH)_3$, $CH(NH_2)_2$, $C(NH_2)_2$, $CH(OH)_2$, $C(OH)_3$, $CH(CN)_2$ and $C(CN)_3$.

Particularly to be mentioned are substituted or unsubstituted, mono- or polynuclear aromatic di-, tri- and tetracarboxylic acids and substituted or unsubstituted, aromatic, at least one hetero atom comprising aromatic di-, tri- and tetracarboxylic acids, which have one or more nuclei. Preferred bidendate organic compounds in the context of the present invention are alkyl group substructures with at least two carboxy groups and/or aryl groups ith one or two phenyl rings having at least two carboxy groups.

A preferred ligand is 1,3,5-benzene tricarboxylate (BCT). Further preferred ligands are ADC (acetylene dicarboxylate), NDC (naphtalen dicarboxylate), BDC (benzene dicarboxylate), ATC (adamantane tetracarboxylate), BTC (benzene tricarboxylate), BTB (benzene tribenzoate), MTB (methane tetrabenzoate) and ATB (adamantane tribenzoate).

Besides the at least bidentate organic compound, the framework material as used in accordance with the present invention may also comprise one or more mono-dentate ligand(s), which is/are preferably selected from the following mono-dentate substances and/or derivatives thereof:

a. alkyl amines and their corresponding alkyl ammonium salts, containing linear, branched, or cyclic aliphatic groups, having from 1 to 20 carbon atoms (and their corresponding ammonium salts);

b. aryl amines and their corresponding aryl ammonium salts having from 1 to 5 phenyl rings;

c. alkyl phosphonium salts, containing linear, branched, or cyclic aliphatic groups, having from 1 to 20 carbon atoms;

d. aryl phosphonium salts, having from 1 to 5 phenyl rings;

e. alkyl organic acids and the corresponding alkyl organic anions (and salts) containing linear, branched, or cyclic aliphatic groups, having from 1 to 20 carbon atoms;

f. aryl organic acids and their corresponding aryl organic anions and salts, having from 1 to 5 phenyl rings;

g. aliphatic alcohols, containing linear, branched, or cyclic aliphatic groups, having from 1 to 20 carbon atoms;

h. aryl alcohols having from 1 to 5 phenyl rings;

i. inorganic anions from the group consisting of: sulfate, nitrate, nitrite, sulfite, bisulfite, phosphate, hydrogen phosphate, dihydrogen phosphate, diphosphate, triphosphate, phosphite, chloride, chlorate, bromide, bromate, iodide, iodate, carbonate, bicarbonate, and the corresponding acids and salts of the aforementioned inorganic anions, j. ammonia, carbon dioxide, methane, oxygen, ethylene, hexane, benzene, toluene, xylene, chlorobenzene, nitrobenzene, naphthalene, thiophene, pyridine, acetone, 1-2-dichloroethane, methylenechloride, tetrahydrofuran, ethanolamine, triethylamine and trifluoromethylsulfonic acid.

Further details regarding the at least bidentate organic compounds and the mono-dentate substances, from which the ligands of the framework material as used in the present application are derived, can be taken from EP-A 0 790 253, whose respective content is incorporated into the present application by reference.

Within the present application, framework materials of the kind described herein, which comprise $Zn^{2+}$ as a metal ion and ligands derived from terephthalic acid as the bidentate compound, are particularly preferred. Said framework materials are known as MOF-5 in the literature.

Further metal ions and at least bidentate organic compounds and mono-dentate ubstances, which are respectively useful for the preparation of the framework materials used in the present invention as well as processes for their preparation are particularly disclosed in EP-A 0 790 253, U.S. Pat. No. 5,648,508 and DE 101 11230.0.

As solvents, which are particularly useful for the preparation of MOF-5, in addition to the solvents disclosed in the above-referenced literature, dimethyl formamide, diethyl formamide and N-methylpyrollidone, alone, in combination with each other or in combination with other solvents may be used. Within the preparation of the framework materials, particularly within the preparation of MOF-5, the solvents and mother liquors are recycled after crystallization in order to save costs and materials.

The pore sizes of the metal-organic framework can be adjusted by selecting suitable organic ligands and/or bidendate compounds (=linkers). Generally, the larger the linker, the larger the pore size. Any pore size that is still supported by a the metal-organic framework in the absence of a host and at temperatures of at least 200° C. is conceivable. Pore sizes ranging from 0.2 nm to 30 nm are preferred, with pore sizes ranging from 0.3 nm to 3 nm being particularly preferred.

In the following, examples of metal-organic framework materials (MOFs) are given to illustrate the general concept given above. These specific examples, however, are not meant to limit the generality and scope of the present application.

By way of example, a list of metal-organic framework materials already synthesized and characterized is given below. This also includes novel isoreticular metal organic framework materials (IR-MOFs), which may be used in the context of the present application. Such materials having the same framework topology while displaying different ore sizes and crystal densities are described, for example in M. Eddouadi et al., *Science* 295 (2002) 469, whose respective content is incorporated into the present application by reference The solvents used are of particular importance for the synthesis of these materials and are therefore mentioned in the table. The values for the cell parameters (angles $\alpha$, $\beta$ and $\gamma$ as well as the spacings a, b and c, given in Angstrom) have been obtained by x-ray diffraction and represent the space group given in the table as well.

| MOF-n | Ingredients molar ratios M + L | Solvents | $\alpha$ | $\beta$ | $\gamma$ | a | b | c | Space Group |
|---|---|---|---|---|---|---|---|---|---|
| MOF-0 | $Zn(NO_3)_2 \cdot 6H_2O$ $H_3(BTC)$ | ethanol | 90 | 90 | 120 | 16.711 | 16.711 | 14.189 | P6(3)/Mcm |
| MOF-2 | $Zn(NO_3)_2 \cdot 6H_2O$ (0.246 mmol) $H_2(BDC)$ 0.241 mmol) | DMF toluene | 90 | 102.8 | 90 | 6.718 | 15.49 | 12.43 | P2(1)/n |
| MOF-3 | $Zn(NO_3)_2 \cdot 6H_2O$ (1.89 mmol) $H_2(BDC)$ (1.93 mmoI) | DMF MeOH | 99.72 | 111.11 | 108.4 | 9.726 | 9.911 | 10.45 | P-1 |
| MOF-4 | $Zn(NO_3)_2 \cdot 6H_2O$ (1.00 mmol) $H_3(BTC)$ (0.5 mmol) | ethanol | 90 | 90 | 90 | 14.728 | 14.728 | 14.728 | P2(1)3 |
| MOF-5 | $Zn(NO_3)_2 \cdot 6H_2O$ (2.22 mmol) $H_2(BDC)$ (2.17 mmol) | DMF chlorobenzene | 90 | 90 | 90 | 25.669 | 25.669 | 25.669 | Fm-3m |
| MOF-38 | $Zn(NO_3)_2 \cdot 6H_2O$ (0.27 mmol) $H_3(BTC)$ (0.15 mmol) | DMF chlorobenzene | 90 | 90 | 90 | 20.657 | 20.657 | 17.84 | 14 cm |
| MOF-31 $Zn(ADC)_2$ | $Zn(NO_3)_2 \cdot 6H_2O$ 0.4 mmol $H_2(ADC)$ 0.8 mmol | ethanol | 90 | 90 | 90 | 10.821 | 10.821 | 10.821 | Pn(-3)m |

-continued

| MOF-n | Ingredients molar ratios M + L | Solvents | α | β | γ | a | b | c | Space Group |
|---|---|---|---|---|---|---|---|---|---|
| MOF-12 Zn$_2$(ATC) | Zn(NO$_3$)$_2$.6H$_2$O 0.3 mmol H$_4$(ATC) 0.15 mmol | ethanol | 90 | 90 | 90 | 15.745 | 16.907 | 18.167 | Pbca |
| MOF-20 ZnNDC | Zn(NO$_3$)$_2$.6H$_2$O 0.37 mmol H$_2$NDC 0.36 mmol | DMF chlorobenzene | 90 | 92.13 | 90 | 8.13 | 16.444 | 12.807 | P2(1)/c |
| MOF-37 | Zn(NO$_3$)$_2$.6H$_2$O 0.2 mmol H$_2$NDC 0.2 mmol | DEF chloro- benzene | 72.38 | 83.16 | 84.33 | 9.952 | 11.576 | 15.556 | P-1 |
| MOF-8 Tb$_2$(ADC) | Tb(NO$_3$)$_3$.5H$_2$O 0.10 mmol H$_2$ADC 0.20 mmol | DMSO MeOH | 90 | 115.7 | 90 | 19.83 | 9.822 | 19.183 | C2/c |
| MOF-9 Tb$_2$(ADC) | Tb(NO$_3$)$_3$.5H$_2$O 0.08 mmol H$_2$ADB 0.12 mmol | DMSO | 90 | 102.09 | 90 | 27.056 | 16.795 | 28.139 | C2/c |
| MOF-6 | Tb(NO$_3$)$_3$.5H$_2$O 0.30 mmol H$_2$(BDC) 0.30 mmol | DMF MeOH | 90 | 91.28 | 90 | 17.599 | 19.996 | 10.545 | P21/c |
| MOF-7 | Tb(NO$_3$)$_3$.5H$_2$O 0.15 mmol H$_2$(BDC) 0.15 mmol | H$_2$O | 102.3 | 91.12 | 101.5 | 6.142 | 10.069 | 10.096 | P-1 |
| MOF-69A | Zn(NO$_3$)$_2$.6H$_2$O 0.083 mmol 4,4'BPDC 0.041 mmol | DEF H$_2$O$_2$ MeNH$_2$ | 90 | 111.6 | 90 | 23.12 | 20.92 | 12 | C2/c |
| MOF-69B | Zn(NO$_3$)$_2$.6H$_2$O 0.083 mmol 2,6-NCD 0.041 mmol | DEF H$_2$O$_2$ MeNH$_2$ | 90 | 95.3 | 90 | 20.17 | 18.55 | 12.16 | C2/c |
| MOF-11 Cu$_2$(ATC) | Cu(NO$_3$)$_2$2.5H$_2$O 0.47 mmol H$_2$ATC 0.22 mmol | H$_2$O | 90 | 93.86 | 90 | 12.987 | 11.22 | 11.336 | C2/c |
| MOF-11 Cu$_2$(ATC) dehydr. | | | 90 | 90 | 90 | 8.4671 | 8.4671 | 14.44 | P42/ mmc |
| MOF-14 Cu$_3$(BTB) | Cu(NO$_3$)$_2$2.5H$_2$O 0.28 mmol H$_3$BTB 0.052 mmol | H$_2$O DMF EtOH | 90 | 90 | 90 | 26.946 | 26.946 | 26.946 | Im-3 |
| MOF-32 Cd(ATC) | Cd(NO$_3$)$_2$.4H$_2$O 0.24 mmol H$_4$ATC 0.10 mmol | H$_2$O NaOH | 90 | 90 | 90 | 13.468 | 13.468 | 13.468 | P(-4)3m |
| MOF-33 Zn$_2$(ATB) | ZnCl$_2$ 0.15 mmol H$_4$ATB 0.02 mmol | H$_2$O DMF EtOH | 90 | 90 | 90 | 19.561 | 15.255 | 23.404 | Imma |
| MOF-34 Ni(ATC) | Ni(NO$_3$)$_2$.6H$_2$O 0.24 mmol H$_4$ATC 0.10 mmol | H$_2$O NaOH | 90 | 90 | 90 | 10.066 | 11.163 | 19.201 | P2$_1$2$_1$2$_1$ |
| MOF-36 Zn$_2$(MTB) | Zn(NO$_3$)$_2$.4H$_2$O 0.20 mmol H$_4$MTB 0.04 mmol | H$_2$O DMF | 90 | 90 | 90 | 15.745 | 16.907 | 18.167 | Pbca |
| MOF-39 Zn$_3$O(HBTB) | Zn(NO$_3$)$_2$.4H$_2$O 0.27 mmol H$_3$BTB 0.07 mmol | H$_2$O DMF EtOH | 90 | 90 | 90 | 17.158 | 21.591 | 25.308 | Pnma |
| NO305 | FeCl$_2$.4H$_2$O 5.03 mmol formic acid 86.90 mmol | DMF | 90 | 90 | 120 | 8.2692 | 8.2692 | 63.566 | R-3c |
| NO306A | FeCl$_2$.4H$_2$O 5.03 mmol formic acid 86.90 mmol | DEF | 90 | 90 | 90 | 9.9364 | 18.374 | 18.374 | Pbcn |

-continued

| MOF-n | Ingredients molar ratios M + L | Solvents | α | β | γ | a | b | c | Space Group |
|---|---|---|---|---|---|---|---|---|---|
| N029 MOF-0 like | Mn(Ac)$_2$.4H$_2$O 0.46 mmol H$_3$BTC 0.69 mmol | DMF | 120 | 90 | 90 | 14.16 | 33.521 | 33.521 | P-1 |
| BPR48 A2 | Zn(NO$_3$)$_2$ 6H$_2$O 0.012 mmol H$_2$BDC 0.012 mmol | DMSO toluene | 90 | 90 | 90 | 14.5 | 17.04 | 18.02 | Pbca |
| BPR69 B1 | Cd(NO$_3$)$_2$ 4H$_2$O 0.0212 mmol H$_2$BDC 0.0428 mmol | DMSO | 90 | 98.76 | 90 | 14.16 | 15.72 | 17.66 | Cc |
| BPR92 A2 | Co(NO$_3$)$_2$.6H$_2$O 0.018 mmol H$_2$BDC 0.018 mmol | NMP | 106.3 | 107.63 | 107.2 | 7.5308 | 10.942 | 11.025 | P1 |
| BPR95 C5 | Cd(NO$_3$)$_2$ 4H$_2$O 0.012 mmol H$_2$BDC 0.36 mmol | NMP | 90 | 112.8 | 90 | 14.460 | 11.085 | 15.829 | P2(1)/n |
| Cu C$_6$H$_4$O$_6$ | Cu(NO$_3$)$_2$.2.5H$_2$O 0.370 mmol H$_2$BDC(OH)$_2$ 0.37 mmol | DMF chlorobenzene | 90 | 105.29 | 90 | 15.259 | 14.816 | 14.13 | P2(1)/c |
| M(BTC) MOF-0 like | Co(SO$_4$) H$_2$O 0.055 mmol H$_3$BTC 0.037 mmol | DMF | | Same as MOF-0 | | | | | |
| Tb(C$_6$H$_4$O$_6$) | Tb(NO$_3$)$_3$.5H$_2$O 0.370 mmol H$_2$(C$_6$H$_4$O$_6$) 0.56 mmol | DMF chlorobenzene | 104.6 | 107.9 | 97.147 | 10.491 | 10.981 | 12.541 | P-1 |
| Zn (C$_3$O$_4$) | ZnCl$_2$ 0.370 mmol oxalic acid 0.37 mmol | DMF chlorobenzene | 90 | 120 | 90 | 9.4168 | 9.4168 | 8.464 | P(−3)1m |
| Co(CHO) | Co(NO$_3$)$_2$.5H$_2$O 0.043 mmol formic acid 1.60 mmol | DMF | 90 | 91.32 | 90 | 11.328 | 10.049 | 14.854 | P2(1)/n |
| Cd(CHO) | Cd(NO$_3$)$_2$.4H$_2$O 0.185 mmol formic acid 0.185 mmol | DMF | 90 | 120 | 90 | 8.5168 | 8.5168 | 22.674 | R-3c |
| Cu(C$_3$H$_2$O$_4$) | Cu(NO$_3$)$_2$.2.5H$_2$O 0.043 mmol malonic acid 0.192 mmol | DMF | 90 | 90 | 90 | 8.366 | 8.366 | 11.919 | P43 |
| Zn$_6$ (NDC)$_5$ MOF-48 | Zn(NO$_3$)$_2$.6H$_2$O 0.097 mmol 14 NDC 0.069 mmol | DMF chlorobenzene H$_2$O$_2$ | 90 | 95.902 | 90 | 19.504 | 16.482 | 14.64 | C2/m |
| MOF-47 | Zn(NO$_3$)$_2$ 6H$_2$O 0.185 mmol H$_2$(BDC[CH$_3$]$_4$) 0.185 mmol | DMF chlorobenzene H$_2$O$_2$ | 90 | 92.55 | 90 | 11.303 | 16.029 | 17.535 | P2(1)/c |
| MO25 | Cu(NO$_3$)$_2$.2.5H$_2$O 0.084 mmol BPhDC 0.085 mmol | DMF | 90 | 112.0 | 90 | 23.880 | 16.834 | 18.389 | P2(1)/c |
| Cu-Thio | Cu(NO$_3$)$_2$.2.5H$_2$O 0.084 mmol thiophene dicarboxylic 0.085 mmol | DEF | 90 | 113.6 | 90 | 15.4747 | 14.514 | 14.032 | P2(1)/c |
| ClBDC1 | Cu(NO$_3$)$_2$.2.5H$_2$O 0.084 mmol H$_2$(BDCCl$_2$) 0.085 mmol | DMF | 90 | 105.6 | 90 | 14.911 | 15.622 | 18.413 | C2/c |
| MOF-101 | Cu(NO$_3$)$_2$.2.5H$_2$O 0.084 mmol BrBDC 0.085 mmol | DMF | 90 | 90 | 90 | 21.607 | 20.607 | 20.073 | Fm3m |

-continued

| MOF-n | Ingredients molar ratios M + L | Solvents | α | β | γ | a | b | c | Space Group |
|---|---|---|---|---|---|---|---|---|---|
| $Zn_3(BTC)_2$ | $ZnCl_2$ 0.033 mmol $H_3BTC$ 0.033 mmol | DMF EtOH base added | 90 | 90 | 90 | 26.572 | 26.572 | 26.572 | Fm-3m |
| MOF-j | $Co(CH_3CO_2)_2\cdot 4H_2O$ (1.65 mmol) $H_3(BZC)$ (0.95 mmol) | $H_2O$ | 90 | 112.0 | 90 | 17.482 | 12.963 | 6.559 | C2 |
| MOF-n | $Zn(NO_3)_2\cdot 6H_2O$ $H_3(BTC)$ | ethanol | 90 | 90 | 120 | 16.71 | 116.711 | 14.189 | P6(3)/mcm |
| PbBDC | $Pb(NO_3)_2$ (0.181 mmol) $H_2(BDC)$ (0.181 mmol) | DMF ethanol | 90 | 102.7 | 90 | 8.3639 | 17.991 | 9.9617 | P2(1)/n |
| Znhex | $Zn(NO_3)_2\cdot 6H_2O$ (0.171 mmol) $H_3BTB$ (0.114 mmol) | DMF p-xylene ethanol | 90 | 90 | 120 | 37.1165 | 37.117 | 30.019 | P3(1)c |
| AS16 | $FeBr_2$ 0.927 mmol $H_2(BDC)$ 0.927 mmol | DMF anhydr. | 90 | 90.13 | 90 | 7.2595 | 8.7894 | 19.484 | P2(1)c |
| AS27-2 | $FeBr_2$ 0.927 mmol $H_3(BDC)$ 0.464 mmol | DMF anhydr. | 90 | 90 | 90 | 26.735 | 26.735 | 26.735 | Fm3m |
| AS32 | $FeCl_3$ 1.23 mmol $H_2(BDC)$ 1.23 mmol | DMF anhydr. ethanol | 90 | 90 | 120 | 12.535 | 12.535 | 18.479 | P6(2)c |
| AS54-3 | $FeBr_2$ 0.927 BPDC 0.927 mmol | DMF anhydr. n-propanol | 90 | 109.98 | 90 | 12.019 | 15.286 | 14.399 | C2 |
| AS61-4 | $FeBr_2$ 0.927 mmol m-BDC 0.927 mmol | pyridine anhydr. | 90 | 90 | 120 | 13.017 | 13.017 | 14.896 | P6(2)c |
| AS68-7 | $FeBr_2$ 0.927 mmol m-BDC 1.204 mmol | DMF anhydr. Pyridine | 90 | 90 | 90 | 18.3407 | 10.036 | 18.039 | $Pca2_1$ |
| Zn(ADC) | $Zn(NO_3)_2\cdot 6H_2O$ 0.37 mmol $H_2(ADC)$ 0.36 mmol | DMF chlorobenzene | 90 | 99.85 | 90 | 16.764 | 9.349 | 9.635 | C2/c |
| MOF-12 $Zn_2(ATC)$ | $Zn(NO_3)_2\cdot 6H_2O$ 0.30 mmol $H_4(ATC)$ 0.15 mmol | ethanol | 90 | 90 | 90 | 15.745 | 16.907 | 18.167 | Pbca |
| MOF-20 ZnNDC | $Zn(NO_3)_2\cdot 6H_2O$ 0.37 mmol $H_2NDC$ 0.36 mmol | DMF chlorobenzene | 90 | 92.13 | 90 | 8.13 | 16.444 | 12.807 | P2(1)/c |
| MOF-37 | $Zn(NO_3)_2\cdot 6H_2O$ 0.20 mmol $H_2NDC$ 0.20 mmol | DEF chlorobenzene | 72.38 | 83.16 | 84.33 | 9.952 | 11.576 | 15.556 | P-1 |
| Zn(NDC) (DMSO) | $Zn(NO_3)_2\cdot 6H_2O$ $H_2NDC$ | DMSO | 68.08 | 75.33 | 88.31 | 8.631 | 10.207 | 13.114 | P-1 |
| Zn(NDC) | $Zn(NO_3)_2\cdot 6H_2O$ $H_2NDC$ | | 90 | 99.2 | 90 | 19.289 | 17.628 | 15.052 | C2/c |
| Zn(HPDC) | $Zn(NO_3)_2\cdot 4H_2O$ 0.23 mmol $H_2(HPDC)$ 0.05 mmol | DMF $H_2O$ | 107.9 | 105.06 | 94.4 | 8.326 | 12.085 | 13.767 | P-1 |
| Co(HPDC) | $Co(NO_3)_2\cdot 6H_2O$ 0.21 mmol $H_2(HPDC)$ 0.06 mmol | DMF $H_2O$/ethanol | 90 | 97.69 | 90 | 29.677 | 9.63 | 7.981 | C2/c |
| $Zn_3(PDC)2.5$ | $Zn(NO_3)_2\cdot 4H_2O$ 0.17 mmol $H_2(HPDC)$ 0.05 mmol | DMF/ClBz $H_2O$/TEA | 79.34 | 80.8 | 85.83 | 8.564 | 14.046 | 26.428 | P-1 |

-continued

| MOF-n | Ingredients molar ratios M + L | Solvents | α | β | γ | a | b | c | Space Group |
|---|---|---|---|---|---|---|---|---|---|
| Cd$_2$(TPDC)2 | Cd(NO$_3$)$_2$.4H$_2$O 0.06 mmol H$_2$(HPDC) 0.06 mmol | methanol/CHP H$_2$O | 70.59 | 72.75 | 87.14 | 10.102 | 14.412 | 14.964 | P-1 |
| Tb(PDC)1.5 | Tb(NO$_3$)$_3$.5H$_2$O 0.21 mmol H$_2$(PDC) 0.034 mmol | DMF H$_2$O/ethanol | 109.8 | 103.61 | 100.14 | 9.829 | 12.11 | 14.628 | P-I |
| ZnDBP | Zn(NO$_3$)$_2$.6H$_2$O 0.05 mmol dibenzylphosphate 0.10 mmol | MeOH | 90 | 93.67 | 90 | 9.254 | 10.762 | 27.93 | P2/n |
| Zn$_3$(BPDC) | ZnBr$_2$ 0.021 mmol 4,4'BPDC 0.005 mmol | DMF | 90 | 102.76 | 90 | 11.49 | 14.79 | 19.18 | P21/n |
| CdBDC | Cd(NO$_3$)$_2$.4H$_2$O 0.100 mmol H$_2$(BDC) 0.401 mmol | DMF Na$_2$SiO$_3$ (aq) | 90 | 95.85 | 90 | 11.2 | 11.11 | 16.71 | P21/n |
| Cd-mBDC | Cd(NO$_3$)$_2$.4H$_2$O 0.009 mmol H$_2$(mBDC) 0.018 mmol | DMF MeNH$_2$ | 90 | 101.1 | 90 | 13.69 | 18.25 | 14.91 | C2/c |
| Zn$_4$OBNDC | Zn(NO$_3$)$_2$.6H$_2$O 0.041 mmol BNDC | DEF MeNH$_2$ H$_2$O$_2$ | 90 | 90 | 90 | 22.35 | 26.05 | 59.56 | Fmmm |
| Eu(TCA) | Eu(NO$_3$)$_3$.6H$_2$O 0.14 mmol TCA 0.026 mmol | DMF chlorobenzene | 90 | 90 | 90 | 23.325 | 23.325 | 23.325 | Pm-3n |
| Th(TCA) | Tb(NO$_3$)$_3$.6H$_2$O 0.069 mmol TCA 0.026 mmol | DMF chlorobenzene | 90 | 90 | 90 | 23.272 | 23.272 | 23.372 | Pm-3n |
| Formate | Ce(NO$_3$)$_3$.6H$_2$O 0.138 mmol Formaic acid 0.43 mmol | H$_2$O ethanol | 90 | 90 | 120 | 10.668 | 10.667 | 4.107 | R-3m |
| | FeCl$_2$.4H$_2$O 5.03 mmol Formic acid 86.90 mmol | DMF | 90 | 90 | 120 | 8.2692 | 8.2692 | 63.566 | R-3c |
| | FeCl$_2$.4H$_2$O 5.03 mmol Formic acid 86.90 mmol | DEF | 90 | 90 | 90 | 9.9364 | 18.374 | 18.374 | Pbcn |
| | FeCl$_2$.4H$_2$O 5.03 mmol Formic acid 86.90 mmol | DEF | 90 | 90 | 90 | 8.335 | 8.335 | 13.34 | P-31c |
| NO330 | FeCl$_2$.4H$_2$O 0.50 mmol Formic acid 8.69 mmol | form-amide | 90 | 90 | 90 | 87.749 | 11.655 | 8.3297 | Pnna |
| NO332 | FeCl$_2$.4H$_2$O 0.50 mmol Formic acid 8.69 mmol | DIP | 90 | 90 | 90 | 10.0313 | 18.808 | 18.355 | Pbcn |
| NO333 | FeCl$_2$.4H$_2$O 0.50 mmol Formic acid 8.69 mmol | DBF | 90 | 90 | 90 | 45.2754 | 23.861 | 12.441 | Cmcm |
| NO335 | FeCl$_2$.4H$_2$O 0.50 mmol Formic acid 8.69 mmol | CHF | 90 | 91.372 | 90 | 11.5964 | 10.187 | 14.945 | P21/n |
| NO336 | FeCl$_2$.4H$_2$O 0.50 mmol Formic acid 8.69 mmol | MFA | 90 | 90 | 90 | 11.7945 | 48.843 | 8.4136 | Pbcm |
| NO13 | Mn(Ac)$_2$.4H$_2$O 0.46 mmol Bezoic acid 0.92 mmol | ethanol | 90 | 90 | 90 | 18.66 | 11.762 | 9.418 | Pbcn |

-continued

| MOF-n | Ingredients molar ratios M + L | Solvents | α | β | γ | a | b | c | Space Group |
|---|---|---|---|---|---|---|---|---|---|
| NO29 MOF-0 like | Bipyridine 0.46 mmol Mn(Ac)$_2$.4H$_2$O 0.46 mmol H$_3$BTC 0.69 mmol | DMF | 120 | 90 | 90 | 14.16 | 33.521 | 33.521 | P-1 |
| Mn(hfac)$_2$ (O$_2$CC$_6$H$_5$) | Mn(Ac)$_2$.4H$_2$O 0.46 mmol Hfac 0.92 mmol Bipyridine 0.46 mmol | ether | 90 | 95.32 | 90 | 9.572 | 17.162 | 14.041 | C2/c |
| BPR43G2 | Zn(NO$_3$)$_2$.6H$_2$O 0.0288 mmol H$_2$BDC 0.0072 mmol | DMF CH$_3$CN | 90 | 91.37 | 90 | 17.96 | 6.38 | 7.19 | C2/c |
| BPR48A2 | Zn(NO$_3$)$_2$ 6H$_2$O 0.012 mmol H$_2$BDC 0.012 mmol | DMSO toluene | 90 | 90 | 90 | 14.5 | 17.04 | 18.02 | Pbca |
| BPR49B1 | Zn(NO$_3$)$_2$ 6H$_2$O 0.024 mmol H$_2$BDC 0.048 mmol | DMSO methanol | 90 | 91.172 | 90 | 33.181 | 9.824 | 17.884 | C2/c |
| BPR56E1 | Zn(NO$_3$)$_2$ 6H$_2$O 0.012 mmol H$_2$BDC 0.024 mmol | DMSO n-propanol | 90 | 90.096 | 90 | 14.5873 | 14.153 | 17.183 | P2(1)/n |
| BPR68D10 | Zn(NO$_3$)$_2$ 6H$_2$O 0.0016 mmol H$_3$BTC 0.0064 mmol | DMSO benzene | 90 | 95.316 | 90 | 10.0627 | 10.17 | 16.413 | P2(1)/c |
| BPR69B1 | Cd(NO$_3$)$_2$ 4H$_2$O 0.0212 mmol H$_2$BDC 0.0428 mmol | DMSO | 90 | 98.76 | 90 | 14.16 | 15.72 | 17.66 | Cc |
| BPR73E4 | Cd(NO$_3$)$_2$ 4H$_2$O 0.006 mmol H$_2$BDC 0.003 mmol | DMSO toluene | 90 | 92.324 | 90 | 8.7231 | 7.0568 | 18.438 | P2(1)/n |
| BPR76D5 | Zn(NO$_3$)$_2$ 6H$_2$O 0.0009 mmol H$_2$BzPDC 0.0036 mmol | DMSO | 90 | 104.17 | 90 | 14.4191 | 6.2599 | 7.0611 | Pc |
| BPR80B5 | Cd(NO$_3$)$_2$.4H$_2$O 0.018 mmol H$_2$BDC 0.036 mmol | DMF | 90 | 115.11 | 90 | 28.049 | 9.184 | 17.837 | C2/c |
| BPR80H5 | Cd(NO$_3$)$_2$ 4H$_2$O 0.027 mmol H$_2$BDC 0.027 mmol | DMF | 90 | 119.06 | 90 | 11.4746 | 6.2151 | 17.268 | P2/c |
| BPR82C6 | Cd(NO$_3$)$_2$ 4H$_2$O 0.0068 mmol H$_2$BDC 0.202 mmol | DMF | 90 | 90 | 90 | 9.7721 | 21.142 | 27.77 | Fdd2 |
| BPR86C3 | Co(NO$_3$)$_2$ 6H$_2$O 0.0025 mmol H$_2$BDC 0.075 mmol | DMF | 90 | 90 | 90 | 18.3449 | 10.031 | 17.983 | Pca2(1) |
| BPR86H6 | Cd(NO$_3$)$_2$.6H$_2$O 0.010 mmol H$_2$BDC 0.010 mmol | DMF | 80.98 | 89.69 | 83.412 | 9.8752 | 10.263 | 15.362 | P-1 |
|  | Co(NO$_3$)$_2$.6H$_2$O | NMP | 106.3 | 107.63 | 107.2 | 7.5308 | 10.942 | 11.025 | P1 |
| BPR95A2 | Zn(NO$_3$)$_2$ 6H$_2$O 0.012 mmol H$_2$BDC 0.012 mmol | NMP | 90 | 102.9 | 90 | 7.4502 | 13.767 | 12.713 | P2(1)/c |
| CuC$_6$F$_4$O$_4$ | Cu(NO$_3$)$_2$.2.5H$_2$O 0.370 mmol H$_2$BDC(OH)$_2$ 0.37 mmol | DMF chloro-benzene | 90 | 98.834 | 90 | 10.9675 | 24.43 | 22.553 | P2(1)/n |
| Fe Formic | FeCl$_2$.4H$_2$O 0.370 mmol | DMF | 90 | 91.543 | 90 | 11.495 | 9.963 | 14.48 | P2(1)/n |

-continued

| MOF-n | Ingredients molar ratios M + L | Solvents | α | β | γ | a | b | c | Space Group |
|---|---|---|---|---|---|---|---|---|---|
| Mg Formic | Formic acid 0.37 mmol Mg(NO$_3$)$_2$.6H$_2$O 0.370 mmol | DMF | 90 | 91.359 | 90 | 11.383 | 9.932 | 14.656 | P2(1)/n |
| MgC$_6$H$_4$O$_6$ | Formic acid 0.37 mmol Mg(NO$_3$)$_2$.6H$_2$O 0.370 mmol H$_2$BDC(OH)$_2$ 0.37 mmol | DMF | 90 | 96.624 | 90 | 17.245 | 9.943 | 9.273 | C2/c |
| Zn C$_2$H$_4$BDC MOF-38 | ZnCl$_2$ 0.44 mmol CBBDC 0.261 mmol | DMF | 90 | 94.714 | 90 | 7.3386 | 16.834 | 12.52 | P2(1)/n |
| MOF-49 | ZnCl$_2$ 0.44 mmol m-BDC 0.261 mmol | DMF CH3CN | 90 | 93.459 | 90 | 13.509 | 11.984 | 27.039 | P2/c |
| MOF-26 | Cu(NO$_3$)$_2$.5H$_2$O 0.084 mmol DCPE 0.085 mmol | DMF | 90 | 95.607 | 90 | 20.8797 | 16.017 | 26.176 | P2(1)/n |
| MOF-112 | Cu(NO$_3$)$_2$.2.5H$_2$O 0.084 mmol o-Br-m-BDC 0.085 mmol | DMF ethanol | 90 | 107.49 | 90 | 29.3241 | 21.297 | 18.069 | C2/c |
| MOF-109 | Cu(NO$_3$)$_2$.2.5H$_2$O 0.084 mmol KDB 0.085 mmol | DMF | 90 | 111.98 | 90 | 23.8801 | 16.834 | 18.389 | P2(1)/c |
| MOF-111 | Cu(NO$_3$)$_2$.2.5H$_2$O 0.084 mmol o-BrBDC 0.085 mmol | DMF ethanol | 90 | 102.16 | 90 | 10.6767 | 18.781 | 21.052 | C2/c |
| MOF-110 | Cu(NO$_3$)$_2$.2.5H$_2$O 0.084 mmol thiophene dicarboxylic 0.085 mmol | DMF | 90 | 90 | 120 | 20.0652 | 20.065 | 20.747 | R-3/m |
| MOF-107 | Cu(NO$_3$)$_2$.2.5H$_2$O 0.084 mmol thiophene dicarboxylic 0.085 mmol | DEF | 104.8 | 97.075 | 95.206 | 11.032 | 18.067 | 18.452 | P-1 |
| MOF-108 | Cu(NO$_3$)$_2$.2.5H$_2$O 0.084 mmol thiophene dicarboxylic 0.085 mmol | DBF/ methanol | 90 | 113.63 | 90 | 15.4747 | 14.514 | 14.032 | C2/c |
| MOF-102 | Cu(NO$_3$)$_2$.2.5H$_2$O 0.084 mmol H$_2$(BDCCl$_2$) 0.085 mmol | DMF | 91.63 | 106.24 | 112.01 | 9.3845 | 10.794 | 10.831 | P-1 |
| Clbdcl | Cu(NO$_3$)$_2$.2.5H$_2$O 0.084 mmol H$_2$(BDCCl$_2$) 0.085 mmol | DEF | 90 | 105.56 | 90 | 14.911 | 15.622 | 18.413 | P-1 |
| Cu(NMOP) | Cu(NO$_3$)$_2$.2.5H$_2$O 0.084 mmol NBDC 0.085 mmol | DMF | 90 | 102.37 | 90 | 14.9238 | 18.727 | 15.529 | P2(1)/m |
| Tb(BTC) | Tb(NO$_3$)$_3$.5H$_2$O 0.033 mmol H$_3$BTC 0.033 mmol | DMF | 90 | 106.02 | 90 | 18.6986 | 11.368 | 19.721 | |
| Zn$_3$(BTC)$_2$ Honk | ZnCl$_2$ 0.033 mmol H$_3$BTC 0.033 mmol | DMF ethanol | 90 | 90 | 90 | 26.572 | 26.572 | 26.572 | Fm-3m |
| Zn$_4$O(NDC) | Zn(NO$_3$)$_2$.4H$_2$O 0.066 mmol 14NDC 0.066 mmol | DMF ethanol | 90 | 90 | 90 | 41.5594 | 18.818 | 17.574 | aba2 |
| CdTDC | Cd(NO$_3$)$_2$.4H$_2$O 0.014 mmol | DMF H$_2$O | 90 | 90 | 90 | 12.173 | 10.485 | 7.33 | Pmma |

-continued

| MOF-n | Ingredients molar ratios M + L | Solvents | α | β | γ | a | b | c | Space Group |
|---|---|---|---|---|---|---|---|---|---|
| | thiophene 0.040 mmol DABCO 0.020 mmol | | | | | | | | |
| IRMOF-2 | Zn(NO$_3$)$_2$.4H$_2$O 0.160 mmol o-Br-BDC 0.60 mmol | DEF | 90 | 90 | 90 | 25.772 | 25.772 | 25.772 | Fm-3m |
| IRAMOF-3 | Zn(NO$_3$)$_2$.4H$_2$O 0.20 mmol H$_2$N-BDC 0.60 mmol | DEF ethanol | 90 | 90 | 90 | 25.747 | 25.747 | 25.747 | Fm-3m |
| IRMOF-4 | Zn(NO$_3$)$_2$.4H$_2$O 0.11 mmol [C$_3$H$_7$O]$_2$-BDC 0.48 mmol | DEF | 90 | 90 | 90 | 25.849 | 25.849 | 25.849 | Fm-3m |
| IRMOF-5 | Zn(NO$_3$)$_2$.4H$_2$O 0.13 mmol [C$_5$H$_{11}$O]$_2$-BDC 0.50 mmol | DEF | 90 | 90 | 90 | 12.882 | 12.882 | 12.882 | Pm-3m |
| IRMOF-6 | Zn(NO$_3$)$_2$.4H$_2$O 0.20 mmol [C$_2$H$_4$]-BDC 0.60 mmol | DEF | 90 | 90 | 90 | 25.842 | 25.842 | 25.842 | Fm-3m |
| IRMOF-7 | Zn(NO$_3$)$_2$.4H$_2$O 0.07 mmol 1,4NDC 0.20 mmol | DEF | 90 | 90 | 90 | 12.914 | 12.914 | 12.914 | Pm-3m |
| IRMOF-8 | Zn(NO$_3$)$_2$.4H$_2$O 0.55 mmol 2,6NDC 0.42 mmol | DEF | 90 | 90 | 90 | 30.092 | 30.092 | 30.092 | Fm-3m |
| IRMOF-9 | Zn(NO$_3$)$_2$.4H$_2$O 0.05 mmol BPDC 0.42 mmol | DEF | 90 | 90 | 90 | 17.147 | 23.322 | 25.255 | Pnnm |
| IRMOF-10 | Zn(NO$_3$)$_2$.4H$_2$O 0.02 mmol BPDC 0.012 mmol | DEF | 90 | 90 | 90 | 34.281 | 34.281 | 34.281 | Fm-3m |
| IRMOF-11 | Zn(NO$_3$)$_2$.4H$_2$O 0.05 mmol HPDC 0.20 mmol | DEF | 90 | 90 | 90 | 24.822 | 24.822 | 56.734 | R-3m |
| IRMOF-12 | Zn(NO$_3$)$_2$.4H$_2$O 0.017 mmol HPDC 0.12 mmol | DEF | 90 | 90 | 90 | 34.281 | 34.281 | 34.281 | Fm-3m |
| IRMOF-13 | Zn(NO$_3$)$_2$.4H$_2$O 0.048 mmol PDC 0.31 mmol | DEF | 90 | 90 | 90 | 24.822 | 24.822 | 56.734 | R-3m |
| IRMOF-14 | Zn(NO$_3$)$_2$.4H$_2$O 0.17 mmol PDC 0.12 mmol | DEF | 90 | 90 | 90 | 34.381 | 34.381 | 34.381 | Fm-3m |
| IRMOF-15 | Zn(NO$_3$)$_2$.4H$_2$O 0.063 mmol TPDC 0.025 mmol | DEF | 90 | 90 | 90 | 21.459 | 21.459 | 21.459 | Im-3m |
| TRMOF-16 | Zn(NO$_3$)$_2$.4H$_2$O 0.0126 mmol TPDC 0.05 mmol | DEF NMP | 90 | 90 | 90 | 21.49 | 21.49 | 21.49 | Pm-3m |

ADC Acetylene dicarboxyiic acid
NDC Naphtalene dicarboxylic acid
BDC Benzene dicarboxylic acid
ATC Adamantane tetracarboxylic acid
BTC Benzene tricarboxylic acid
BTB Benzene tribenzoate
MTB Methane tetrabenzoate
ATB Adamantane tetrabenzoate
ADB Adamantane dibenzoate Examples for the synthesis of these materials as such can, for example, be found in: J. Am. Chem. Soc. 123 (2001) pages 8241ff or in Acc. Chem. Res. 31 (1998) pages 474ff, which are fully encompassed within the content of the present application.

The separation of the framework materials, particularly of MOF-5, from the mother liquor of the crystallization may be achieved by procedures known in the art such as solid-liquid separations, centrifugation, extraction, filtration, membrane filtration, cross-flow filtration, flocculation using flocculation adjuvants (non-ionic, cationic and anionic adjuvants) or by the addition of pH shifting additives such as salts, acids or bases, by flotation, as well as by evaporation of the mother liquor at elevated temperature and/or in vacuo and concentrating of the solid. The material obtained in this step is typically a fine powder and is not optimally suited for most practical applications, e.g. in catalysis, where shaped bodies are preferred. Therefore, the powder is pressed or granulated or formed by any process known to the expert in the art, in particular any process that results in forming a powder into a shaped body. Such a process is disclosed, e.g. in the U.S. application Ser. No. 10/157182.

It is also possible to bring the catalyst containing a metal-organic framework that already had been crystallized in contact with at least one additional metal selected from the main groups and/or the subgroups of the periodic table of the elements. In a preferred embodiment, in order to produce said catalyst, the metal-organic framework material as described above is brought in contact with a substance, preferably a powder, a solution or a suspension, containing at least one metal of the main groups or the subgroups of the periodic table of the elements.

The term "bringing in contact" in the context of the present invention refers to any procedure yielding a metal-organic framework catalyst as described above, containing, at least in parts, at least one additional metal component. As far as the methods of bringing the metal-organic framework in contact with an additional metal component, any method known to the expert in the field, in particular any method known in the context of charging a porous material, can be used. In a preferred embodiment, these methods include but are not limited to: dipping, coating, spraying, impregnating, soaking, applying, precipitating, co-precipitating, kneading, powder kneading.

The additional metal is selected form the group consisting of the main group or the subgroup metals of the periodic table of the elements, preferably form the group of the sub group metals, further preferred from the group of Cu, Ag, Au, Fe, Co, Ni, Ru, Rh, Pd, Os, Ir, Pt, particularly preferred from the group of Pd, Pt, Au. Mixtures of at least two of all of the aforementioned substances are included as well. Bringing the catalyst in contact with additional Zn is conceivable as well.

As far as the alkene oxide to be used in the ring opening reaction of the present invention is concerned, any substance can be used that contains at least two adjacent carbon atoms that are connected via a C—C-bond and, additionally, via a common oxygen atom. Compounds of this type are also known to the expert as "epoxides" or "oxiranes". Any such epoxide can be used for the reaction according to the invention.

As far as said oxiranes are concerned, ethylene oxide as well as substituted epoxides are preferred. These compounds can be characterized by the following general formula:

Therein, the groups $R^2$ can be, independently from each other, hydrogen, halogen, —$NO_2$, —CN, —$COOR^3$ or a carbohydrate group with 1 to 32 C-atoms, wherein said carbohydrate group may be substituted or unsubstituted. All groups $R^2$ may be the same for the compound (II), either for all groups or for at least two groups. All four groups may be different as well.

Geminally substituted epoxides are preferred, while epoxides substituted exclusively in the 1-position are particularly preferred. Specifically, the use of ethylene oxide, propylene oxide or cylcohexene oxide is preferred. The use of propylene oxide (PO) is particularly preferred. For further specifications with respect to epoxides/oxiranes to be used in the present invention, reference is made to DE 102 35 317.4 the entire contents of which are hereby incorporated by reference.

As far as the reaction conditions and process parameters for the production of polypropylene carbonates are concerned, all reaction conditions and/or parameters that are known to expert in the field of polyalkylene carbonate polymerization are possible, so long as the metal-organic framework catalyst according to the invention remains functional. Specifically, conditions described in DE 101 47 712.0 and DE 102 26 742. 2 are included in the present application by reference.

In a preferred embodiment, the catalyst according to the invention is added to the reaction chamber while being cooled. If suited, the epoxide may be added to the solution/suspension of the catalyst prior to adding the catalyst into the reaction chamber. Furthermore, it is possible to directly add the epoxide into the reaction chamber. Preferably, the polymerization reaction is conducted under inert conditions, i.e. in the absence of moisture and/or air.

The polymerization reaction may be conducted continuously or in a batch-mode.

In general, the polymerization reaction is conducted at elevated pressure and/or elevated temperature. However, product is formed even at a $CO_2$ partial pressure of 1 bar (ambient pressure). The pressure within the reaction chamber is generally created by gaseous $CO_2$. In specific application, said pressure may be created by an inert medium such as Ar or $N_2$. Typically, the pressure ranges from 1 to 250 bar, preferably from 10 to 150 bar, further preferred from 15 to 120 bar. The reaction may be conducted at temperatures from −10° C. to 200° C., while temperatures from 20 to 150° C. are preferred and temperatures from 40 to 120° C. are particularly preferred.

The invention is now further described by way of the following examples, which are, however, not meant to limit the scope of the present application.

EXAMPLES

Example 1

Preparation of the Metal-Organic Framework Material

In a beaker, 2.43 g of dihydroxy terephthalic acid and 9.66 g of zinc nitrate tetrahydrate are dissolved in 282.2 g of diethyl formamide and added into two teflon covered autoclaves of 250 ml volume. The resulting solution is of yellowish green color. Thereto, 1.24 g of triethyl amine are added dropwise (per autoclave). A white substance with the consistency of a gel forms.

These batches are crystallized for the duration of 20 hours at a temperature of 105° C. The reaction product contains yellow crystals within a yellowish orange solution.

The crystals so obtained are added into a beaker, together with the solution. The suspension is filtered under nitrogen atmosphere and is rinsed three times with chlorofom. After having been rinsed, the crystals are transferred into a vacuum flask (under nitrogen atmosphere) and activated by applying a high vaccum (turbo molecular pump). The yield is 5.9 g. The material so obtained displays the x-ray diffraction pattern represented in FIG. 1.

Figure 1:
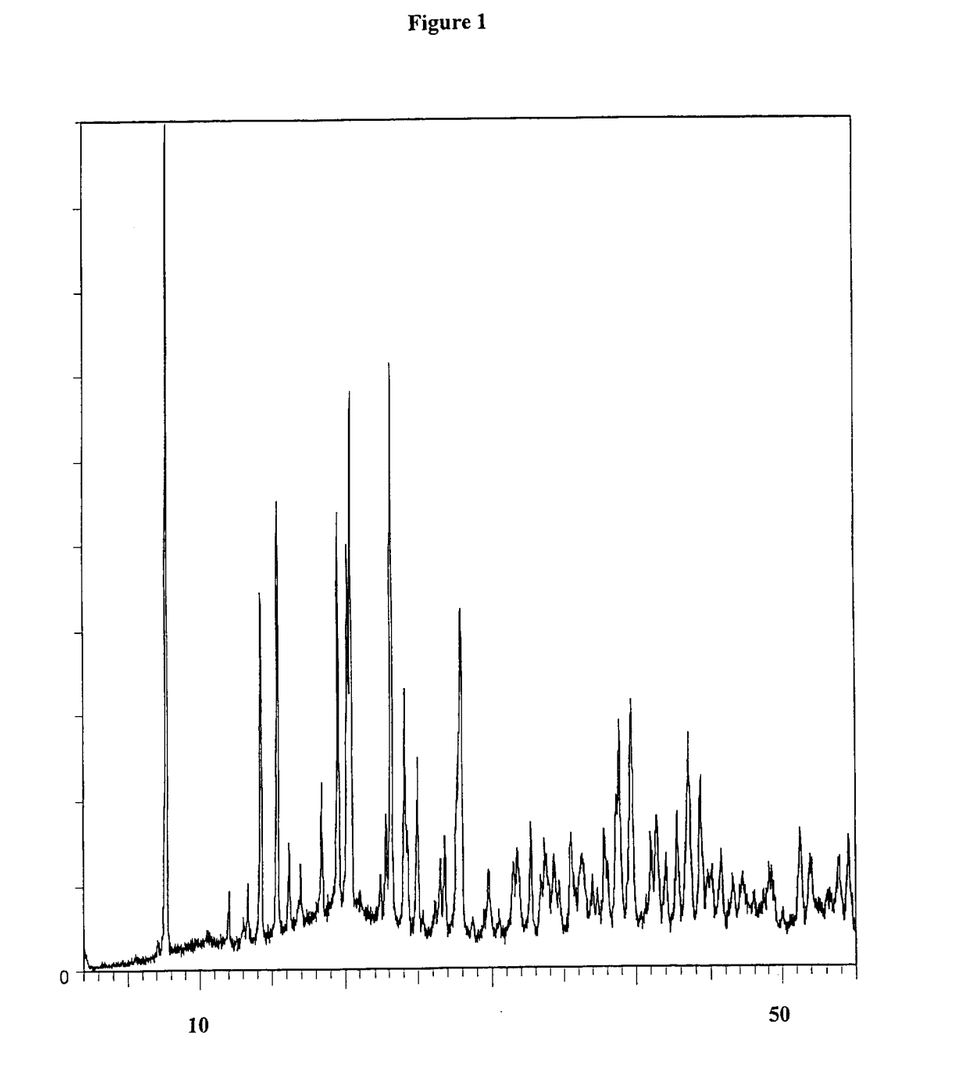
FIG. 1 is an X-ray diffraction pattern of the metal-organic framework material of Example 1.

FIG. 1 shows on the horizontal axis (x-axis) the x-ray diffraction angle 2Θ in units of degrees, while the vertical axis (y-axis) represents the diffracted intensity on a logarithmic scale and in arbitrary units.

Example 2

Preparation of a Metal-Organic Framework Material

Metal organic framework materials using a different ligand have been obtained accoridng to the following procedure:

In a reaction flask, 3.67 g of benzene tricarboxylic acid and 19.26 g of zinc nitrate tetrahydrate are dissolved in 261.5 g of diethyl formamide. The mixture is heated to 130° C. while stirring and kept at said temperature for 1.5 h in order to induce crystallization.

The resulting suspension is filtered under nitrogen atmosphere and is rinsed three times with chlorofom. After having been rinsed, the crystals are transferred into a vacuum flask (under nitrogen atmosphere and at room temperature) and activated by applying a high vaccum (turbo molecular pump). The yield is 10 g. The catalytic material so obtained displays the x-ray diffraction pattern represented in FIG. 2.

Figure 2:
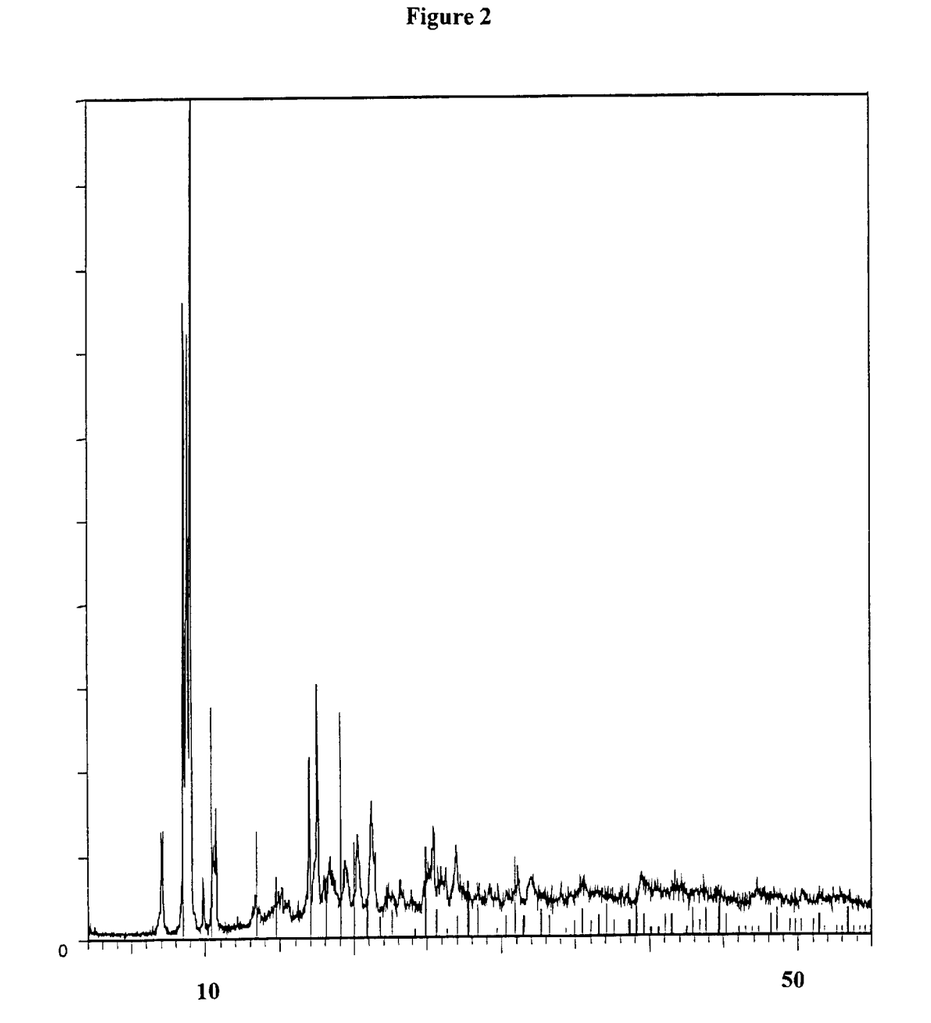
FIG. 2 is an X-ray diffraction pattern of the metal-organic framework material of Example 2.

FIG. 2 shows on the horizontal axis (x-axis) the x-ray diffraction angle 2Θ in units of degrees, while the vertical axis (y-axis) represents the diffracted intensity on a logarithmic scale and in arbitrary units.

Example 3

Method of Using the Catalytic Materials from Examples 1 and 2 in Alternating Copolymerization Reactions We were surprised to find that catalysts of Examples 1 and 2 are active catalysts for the reaction of alternating copolymerization.

The reaction of PO (2 ml) in toluene (0.5 ml) at 20 bar of CO2 pressure was followed by monitoring the pressure drop as a result of $CO_2$ decrease. After 3 hours of reaction time, the resulting polymer was precipitated in a non-solvent and isolated. Yields were found to be up to 25% by weight based on the PO content.

Analysis of the polymer by NMR and SEC revealed that indeed polycarbonate had been formed (>80% carbonate linkages) with weight average molecular weights of 60,000–75.000 g/mol and a dispersity index of less than 8. Although these numbers suggest that there is room for improvement, the fact that activity and yield are a function of the specific structure of the MOF suggest that by way of tailoring a particular MOF-based catalyst, highly active catalysts for copolymerization reactions will be found.

What is claimed as new and is intended to be secured by Letters Patent is:

1. A process for the preparation of polyalkylene carbonates comprising:
   reacting carbon dioxide or a carbon dioxide-delivering substances and an alkene oxide or alkene oxide precursor in the presence of a catalyst,
   wherein said catalyst comprises a metal-organic framework material having pores and prepared from at least one metal ion and at least one bidentate organic compound coordinately bound to said metal ion.

2. The process of claim 1, wherein the metal ion of the metal-organic framework catalyst comprises an ion selected from group consisting of $Mg^{2+}$, $Ca^{2+}$, $Sr^{2+}$, $Ba^{2+}$, $Sc^{3+}$, $y^{3+}$, $Ti^{4+}$, $Zr^{4+}$, $Hf^{4+}$, $V^{4+}$, $V^{3+}$, $V^{2+}$, $Nb^{3+}$, $Ta^{3+}$, $Cr^{3+}$, $Mo^{3+}$, $W^{3+}$, $Mn^{3+}$, $Mn^{2+}$, $Re^{2+}$, $Fe^{3+}$, $Ru^{3+}$, $Ru^{2+}$, $Os^{3+}$, $Os^{2+}$, $Co^{3+}$, $Co^{2+}$, $Rh^{2+}$, $Rh^{+}$, $Ir^{2+}$, $Ir^{+}$, $Ni^{2+}$, $Ni^{+}$, $Pd^{2+}$, $Pd^{+}$, $Pt^{2+}$, $Pt^{+}$, $Cu^{2+}$, $Cu^{+}$, $Ag^{+}$, $Au^{+}$, $Zn^{2+}$, $Cd^{2+}$, $Hg^{2+}$, $Al^{3+}$, $Ga^{3+}$, $In^{3+}$, $Tl^{3+}$, $Si^{4+}$, $Si^{2+}$, $Ge^{4+}$, $Ge^{2+}$, $Sn^{2+}$, $Pb^{4+}$, $Pb^{2+}$, $As^{5+}$, $As^{3+}$, $As^{3+}$, $Sb^{5+}$, $Sb^{3+}$, $Sb^{+}$, $Bi^{5+}$, $Bi^{3+}$, and $Bi^{+}$.

3. The process of claim 2, wherein the metal ion is $Zn^{2+}$.

4. The process of claim 1, wherein the at least bidentate organic compound has a substructure bound to at least one bidentate functional group, said substructure is selected from the group consisting of alkyl groups, an aryl group having 1 or 2 phenyl rings, and combinations thereof, and said bidentate functional group has at least 2 carboxy groups.

5. The process of claim 4, wherein the at least bidentate organic compound is terephthalic acid or 2,5-dihydroxy terephthalic acid.

6. The process of claim 1, wherein the alkene oxide is selected from the group consisting of ethylene oxide, propylene oxide and cyclohexene oxide.

7. The process of claim 1, wherein the catalyst has a specific surface area of more than 5 $m^2/g$.

8. The process of claim 4, wherein said substructure is an alkyl group having 1 to 10 carbon atoms.

9. The process of claim 1, wherein the at least bidentate organic compound is selected from the group consisting of 1,3,5-benzene tricarboxylate, acetylene dicarboxylate, naphtalen dicarboxylate, benzene dicarboxylate, adamantane tetracarboxylate, benzene tricarboxylate, benzene tribenzoate, methane tetrabenzoate, and adamantane tribenzoate.

10. The process of claim 1, wherein said catalyst further comprises at least one monodentate ligand.

11. The process of claim 10, wherein the monodentate ligand is selected from the group consisting of alkyl amines having linear, branched, or cyclic aliphatic groups of from 1 to 20 carbon atoms, and alkyl ammonium salts thereof; aryl amines having from 1 to 5 phenyl rings, and aryl ammonium salts thereof; alkyl phosphonium salts, having linear, branched, or cyclic aliphatic groups of from 1 to 20 carbon atoms; aryl phosphonium salts having from 1 to 5 phenyl rings; alkyl organic acids having linear, branched, or cyclic aliphatic groups of from 1 to 20 carbon atoms, and alkyl organic anions and salts thereof; aryl organic acids having from 1 to 5 phenyl rings, and aryl organic anions and salts thereof; linear, branched, or cyclic aliphatic alcohols having from 1 to 20 carbon atoms;
   aryl alcohols having from 1 to 5 phenyl rings; inorganic anions of the group consisting of sulfate, nitrate, nitrite, sulfite, bisulfite, phosphate, hydrogen phosphate, dihydrogen phosphate, diphosphate, triphosphate, phosphite, chloride, chlorate, bromide, bromate, iodide, iodate, carbonate, bicarbonate, and acids and salts thereof; and ammonia, carbon dioxide, methane, oxygen, ethylene, hexane, benzene, toluene, xylene, chlorobenzene, nitrobenzene, naphthalene, thiophene, pyridine, acetone, 1-2-dichloroethane, methylenechloride, tetrahydrofuran, ethanolamine, triethylamine and trifluoromethylsulfonic acid.

12. The process of claim 1, wherein the catalyst has a pore size of from 0.2 to 30 nm.

13. The process of claim 1, wherein said catalyst is contacted with an additional metal prior to said reacting.

14. The process of claim 13, wherein said additional metal is selected from the group consisting of Cu, Ag, Au, Fe, Co, Ni, Ru, Rh, Pd, Os, Ir, and Pt.

15. The process of claim 1, wherein carbon dioxide and an alkylene oxide are reacted in the presence of the catalyst, and said alkylene oxide is geninally substituted.

16. The process of claim 1, wherein the catalyst is in the form of a powder.

17. The process of claim 1 wherein the process is a continuous process.

18. The process of claim 1, wherein the process is a batch process.

19. The process of claim 1, wherein said reacting is carried out at a temperature of from −10° C. to 200° C.

20. The process of claim 1, wherein said reacting is carried out at a pressure of from 1 to 250 bar.

* * * * *